United States Patent [19]

Sekiya et al.

[11] Patent Number: 5,601,112

[45] Date of Patent: Feb. 11, 1997

[54] CHECK VALVE

[75] Inventors: Mutsuo Sekiya; Hirofumi Doi; Takakazu Tochimoto; Masashi Wakisaka, all of Hyogo, Japan

[73] Assignee: Mitsubishi Denki Kabushiki Kaisha, Tokyo, Japan

[21] Appl. No.: 387,597

[22] Filed: Feb. 13, 1995

[30] Foreign Application Priority Data

Oct. 4, 1994 [JP] Japan .................................. 6-240173

[51] Int. Cl.⁶ .................................................. F16R 15/14
[52] U.S. Cl. ................ 137/512.15; 137/854; 137/543.15
[58] Field of Search ........................ 137/512.15, 543.15, 137/854

[56] References Cited

U.S. PATENT DOCUMENTS

| 828,036 | 8/1906 | Lindsay | 137/543.15 |
|---|---|---|---|
| 2,747,609 | 5/1956 | Sekera | 137/560 |
| 3,007,693 | 11/1961 | Templeton | 137/543.15 |
| 3,605,132 | 9/1971 | Lineback | 137/854 X |
| 3,840,175 | 10/1974 | Jacuzzi | 137/543.15 X |
| 3,845,784 | 11/1974 | Sullivan | 137/543.15 X |
| 5,014,739 | 5/1991 | Csazar | 137/512.15 |

FOREIGN PATENT DOCUMENTS

| 875747 | 5/1953 | Germany | 137/854 |
|---|---|---|---|
| 2636490 | 5/1977 | Germany . | |
| 4305987 | 11/1993 | Germany . | |
| 5027121 | 3/1975 | Japan . | |
| 5667466 | 10/1979 | Japan . | |
| 202028 | 2/1966 | Sweden | 137/854 |
| 655560 | 7/1951 | United Kingdom | 137/543.15 |
| 1210013 | 10/1970 | United Kingdom | 137/854 |

*Primary Examiner*—John Rivell
*Attorney, Agent, or Firm*—Sughrue, Mion, Zinn, Macpeak & Seas

[57] ABSTRACT

A check valve has a valve element 12 integral with a metallic bushing 11 and made of a substantially annular rubber material. A hole is provided in the center of the valve element, and a shaft 13 passes through the hole. A spring 2 is mounted around the shaft, and a back face of the valve element is supported at one end of the spring through the metallic bushing. A truncated conical stopper 4 includes a recess at an intermediate portion, and is mounted downstream of the valve element to restrict the amount of movement and deformation of the valve element. The stopper is fixed at one end 13b of the shaft. It is thereby possible to provide a reliable check valve in which flow resistance can significantly be reduced, and sufficient safety can be established against counter flow pressure.

4 Claims, 9 Drawing Sheets

CHECK VALVE

BACKGROUND OF THE INVENTION

1. Field of the Invention

The present invention relates to a check valve for passing a flow only in a predetermined direction, for use in, for example, a secondary air supply system for an internal combustion engine.

2. Description of the Related Art

In the prior art, there are well-known check valves of this type including a reed valve utilizing the elastic force of a metallic thin plate called a reed, and a disc valve utilizing the elastic force of a disc-like rubber plate.

FIGS. 11 and 12 are sectional views showing a structure of a conventional disc-like check valve of the latter type. FIG. 11 shows a closed state of a valve element, and FIG. 12 shows an opened state of the valve element. In the drawing, reference numeral 1 designates the valve element, 2 is a spring, 3 is a valve seat, 4 is a stopper, 5 is an upstream hollow case, 6 is a downstream hollow case, 30 is a communicating hole, 40 is a caulked fixing portion, and 50 and 60 are respectively opening portions in the upstream hollow case 5 and in the downstream hollow case 6.

The valve element 1 includes an elastic material such as a rubber plate, and is pressured by the spring 2 disposed downstream of the valve element 1 in a direction to block the communicating holes 30 provided in the valve seat 3. The stopper 4 is fixed by the caulked fixing portion 40 at an intermediate portion of the valve seat 3 through the valve element 1 and the spring 2 so as to hold the valve element 1 and the spring 2. Further, an outer edge of the valve seat 3 is clamped and fixed between the upstream hollow case 5 including the opening portion 50 serving as an inlet for fluid, and the downstream hollow case 6 including the opening portion 60 serving as an outlet for the fluid.

A description will now be given of the operation. When fluid is supplied upstream of the check valve, fluid pressure is applied to the valve element 1 which is blocking the communicating holes 30 in the valve seat 3. As a flow rate of the fluid more increases, the amount of deformation of both the valve element 1 and the spring 2 increases, thereby passing the fluid introduced through the opening portion 50 in the upstream hollow case 5 toward the opening portion 60 in the downstream hollow case 6.

In this case, in the check valve, as the fluid pressure becomes higher, the amount of deformation of both the valve element 1 and the spring 2 increases to pass a large amount of fluid. However, the amount of deformation is limited by the stopper 4.

When a difference in internal pressure between the upstream hollow case 5 and the downstream hollow case 6 is equal to zero or small, the valve element 1 is pressed by the elastic force of the spring 2 onto the valve seat 3, resulting in a closed state.

Further, the fluid pressure may be applied in a direction opposite to a regular flowing direction, i.e., toward the upstream from the downstream hollow case 6. In such a case, since the valve element 1 receives the fluid pressure in addition to its restoring force and the pressing force of the spring 2, the blocking force of the valve element 1 increases to prevent counter flow of the fluid.

The conventional check valve is provided as set forth above. Therefore, though smaller flowing resistance and a more effective function against counter flow have been desired, the rubber valve element 1 and the spring 2 are elastically deformed by the fluid pressure in the check valve shown in FIGS. 11 and 12. That is, there is a natural problem in that the resistance to flow becomes greater. Alternatively, in order to overcome the problem, there is an available method in which the valve element 1 can easily be deformed. This method of approach, however, reduces the pressure resistance of the valve element 1 to counter flow pressure, resulting in reduced reliability of the check valve. The check valve of the prior art is disclosed in, for example, Japanese Utility Model Publication (Kokai) No. 56-67466, or Japanese Patent Publication (Kokai) No. 50-27121.

SUMMARY OF THE INVENTION

In view of the foregoing, it is an object of the present invention to provide a highly reliable check valve in which flow resistance can be significantly reduced, and sufficient pressure resistance is established against counter flow pressure.

It is another object of the present invention to provide a check valve in which lateral rotary motion of a valve element can be restricted to enhance reliability such as vibration proof.

It is still another object of the present invention to a highly reliable check valve in which movement of a valve element is not interfered with even when contaminants enter a sliding portion of the valve element.

According to the present invention, for achieving the above-mentioned objects, there is provided a check valve including a flexible valve element mounted downstream of a valve seat to be deformable according to fluid pressure, an urging mechanism to urge the valve element in a direction of the valve seat so as to block a communicating hole in the valve seat when no fluid pressure is applied to the valve element, and a valve element moving/supporting mechanism to support the valve element such that the valve element deformed in response to the fluid pressure is movable in a predetermined direction, and to restrict a range of movement of the valve element such that the valve element can be moved to reach a movement limitation when the fluid pressure applied to the valve element reaches a predetermined value.

In operation, when no fluid pressure is applied to at least the valve element, the urging mechanism urges the valve element in the direction of the valve seat so as to block the communicating hole in the valve seat. If appropriate fluid pressure is once generated in the hollow case to be applied to the valve element, the valve element is deformed in response to the fluid pressure to be moved in the predetermined direction. In general, the direction is identical with a direction of an internal fluid flow so that the check valve can pass the fluid in the predetermined direction. Further, when the fluid pressure applied to the valve element reaches the predetermined value, the valve element is moved to reach the movement limitation. As stated above, it is possible to ensure a sufficient sectional area of a flow path by moving the valve element in the direction of a fluid flow, resulting in significant reduction of pressure loss.

According to one preferred embodiment, the valve moving/supporting mechanism of the check valve includes a shaft portion coupled with the valve seat to extend parallel to the predetermined direction, and a cylinder portion fitted into the shaft portion to be slidable along the shaft portion and coupled with the valve element. In operation, the cylinder portion coupled with the valve element is slid along the shaft portion. It is thereby possible to surely move the valve element in the predetermined direction when the valve element receives the fluid pressure.

Further, the cylinder portion of the check valve may preferably include a polygonal cylinder, and the shaft portion may include a polygonal shaft corresponding to the cylinder portion. In the operation, lateral rotary motion is restricted when the valve element is moved. It is thereby possible to avoid, for example, damage to the valve element due to the rotation.

A groove may be provided in a surface of the shaft portion to extend in the predetermined direction. In this case, contaminants are moved and concentrated into the groove even when the contaminants enter the sliding portion of the valve element between the cylinder portion and the shaft portion. It is thereby possible to prevent the contaminants from interfering with the movement of the valve element.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
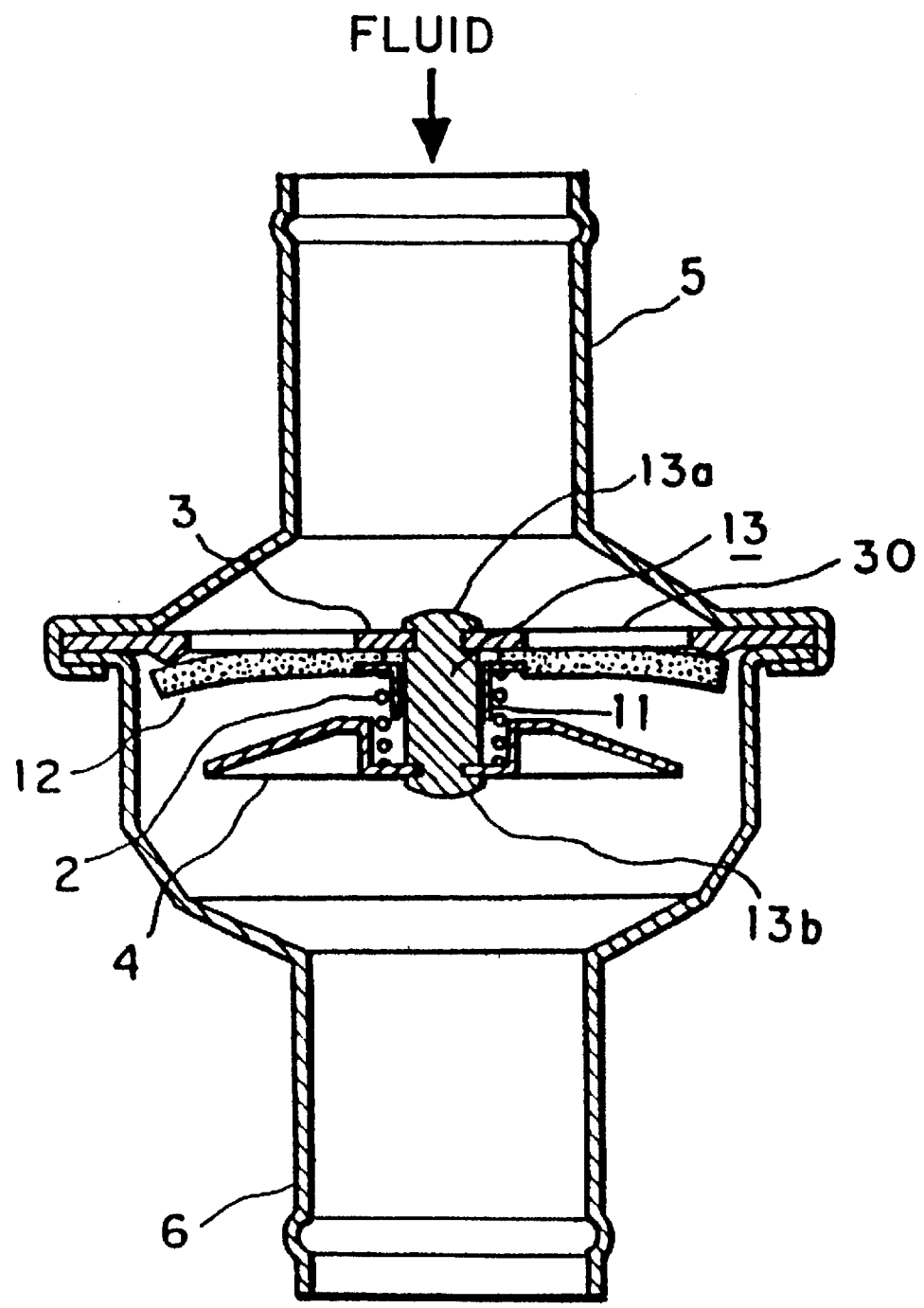
FIG. 1 is a sectional view showing one embodiment of a check valve of the present invention, with a valve element closed.

One embodiment of the invention will now be described in detail referring to FIGS. 1–4 of the accompanying drawings, wherein reference numeral 2 designates a spring, that is, an urging mechanism, 3 is a valve seat, 4 is a stopper, 5 is an upstream hollow case, 6 is a downstream hollow case, 11 is a metallic bushing, that is, a cylinder portion, 12 is a valve element, 13 is a shaft, that is, a shaft portion, and 30 is a communicating hole provided in the valve seat 3. According to the embodiment, a valve element moving/supporting mechanism includes the stopper 4, the metallic bushing 11, and the shaft 13.

The valve element 12 is integrally formed with the metallic bushing 11 and is made of a substantially annular flexible rubber material. A hole is provided in the center of the valve element 12, and the shaft 13 passes through the hole. The spring 2 is mounted about the shaft 13 to urge the valve element 12 in the direction of the valve seat 3. A back face of the valve element 12 is supported through the metallic bushing 11 at one end of the spring 2. One end of the spring 2 is preferably secured to a surface of a projecting portion or flange of the metallic bushing 11. The stopper 4 is disposed downstream of the valve element 12 to restrict the amount of movement and deformation of the valve element 12. The stopper 4 is clamped and fixed between the shaft 13 and one end 13b of the shaft 13. The stopper 4 is provided in a truncated conical form having a recess in an intermediate portion thereof. The spring 2 is accommodated in the recess, and the other end of the spring 2 contacts a bottom portion of the recess. That is, the valve element 12 is supported above the recess of the stopper 4 through the metallic bushing 11 and the spring 2, and a moving direction of the valve element 12 is specified by the shaft 13.

Figure 2:
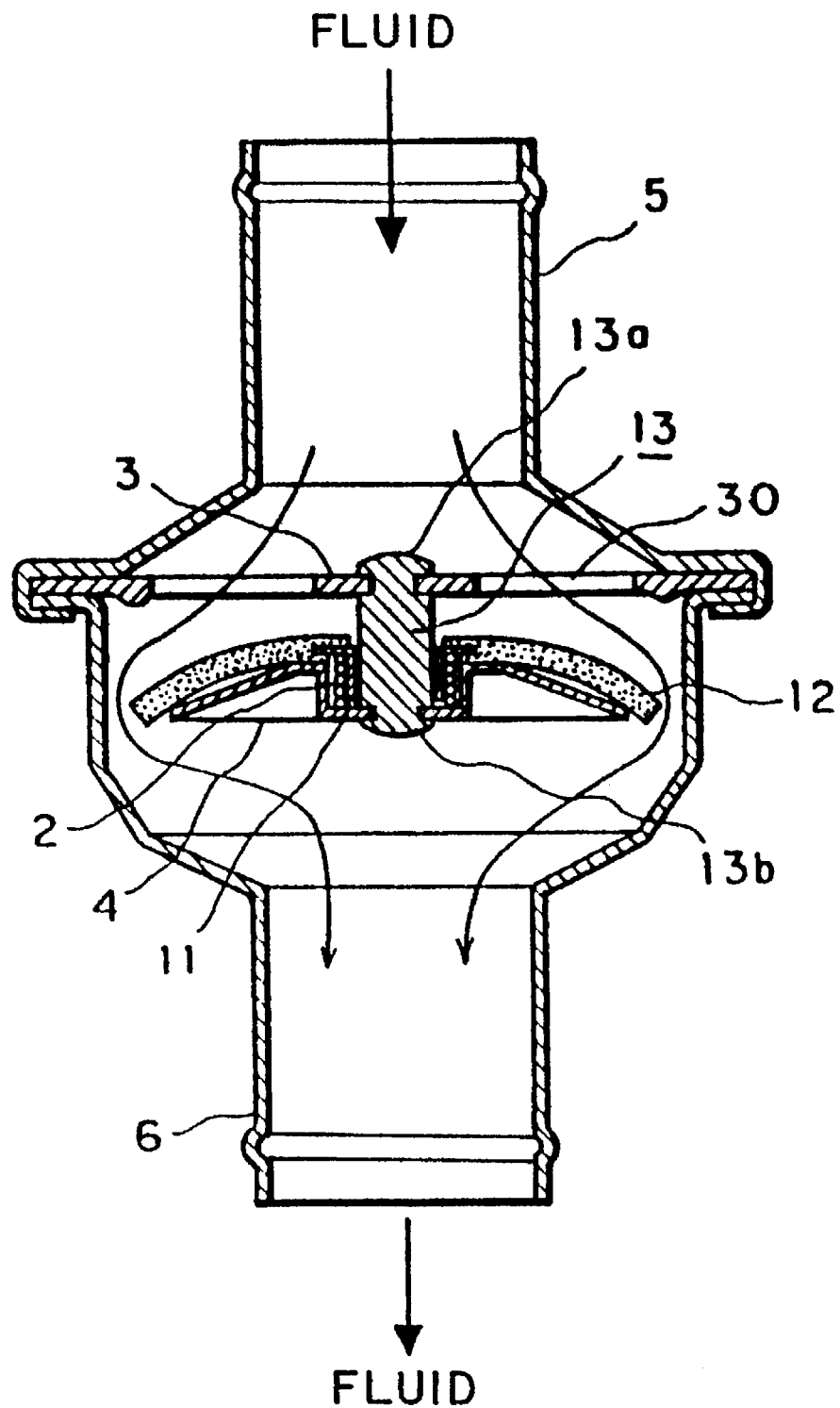
FIG. 2 is a sectional view showing one embodiment of the check valve of the present invention, with a valve element opened.
Figure 4:
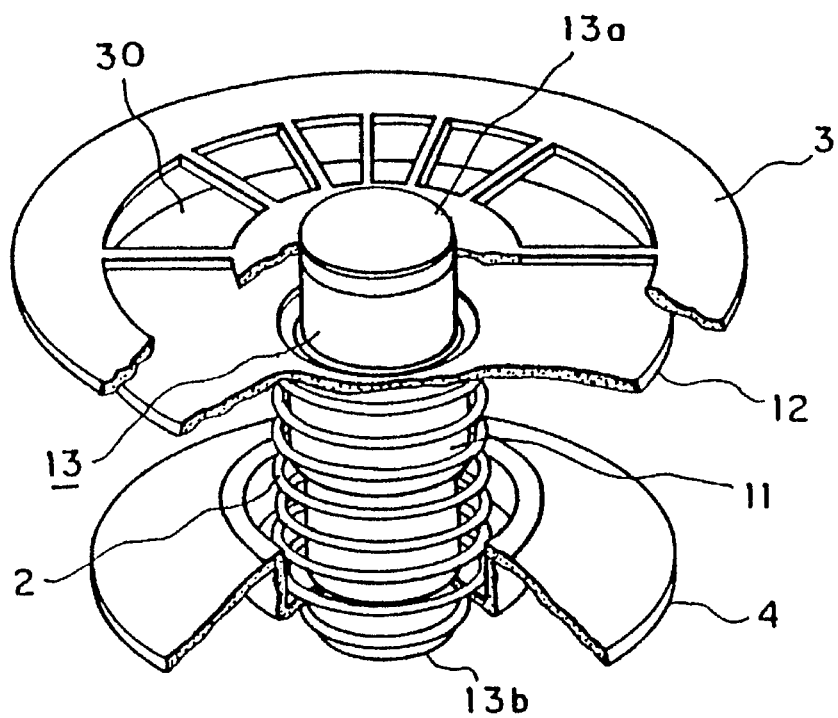
FIG. 4 is a perspective view showing an essential part of the check valve shown in FIGS. 1 and 2.

As shown in FIG. 4, the plurality of communicating holes 30 are provided in the disc-like valve seat 3 which is clamped and fixed between the shaft 13 and the other end 13a of the shaft 13. As shown in FIGS. 1 and 2, an outer edge of the valve seat 3 is clamped and fixed at a joint between the upstream hollow case 5 and the downstream hollow case 6.

Figure 3A:
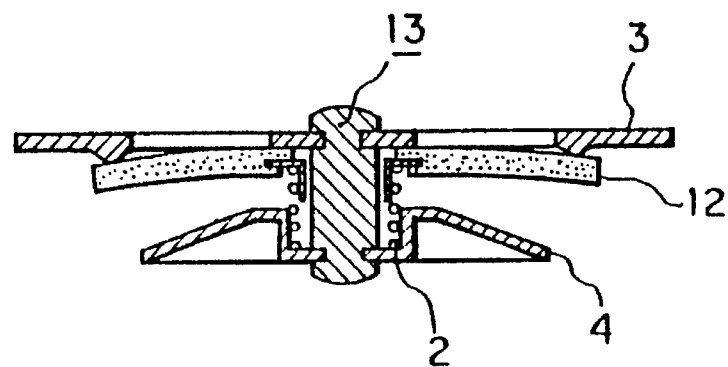
FIGS. 3(a), 3(b), and 3(c) are sectional views showing an essential part of the check valve in the closed state, in the opened state, and in the opened state with the valve element deformed to the utmost extent.

A description will now be given of the operation. When no fluid is supplied, the valve element 12 is pressed by the spring 2 in the direction of the valve seat 3 while the communicating hole in the valve seat 3 is in the blocked state as shown in FIGS. 1 and 3(a).

Figure 3B:
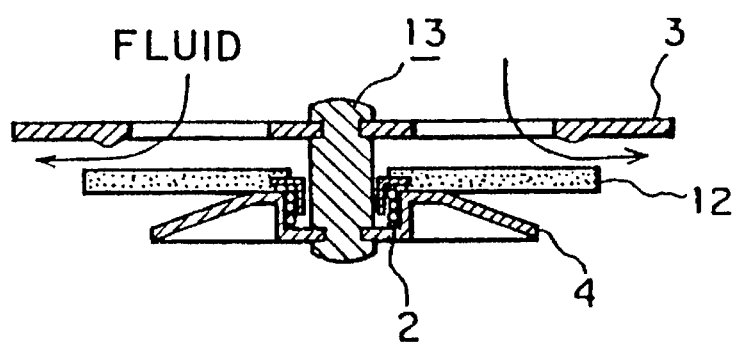

When fluid is supplied through the upstream hollow case 5, the fluid pressure applied to the valve element 12 may exceed the pressing force of the spring 2 disposed at the back face thereof. In this case, the valve element 12 moves along the shaft 13 in the downstream direction so that the back face of the valve element 12 in the vicinity of its center portion first contacts the stopper 4. At this time, a large gap is defined between the valve seat 3 and the valve element 12 to drastically extend a sectional area of a flow path, thereby significantly reducing flow resistance in the check valve. In this case, the check valve is in such a state as shown in FIG. 3(b).

Figure 3C:
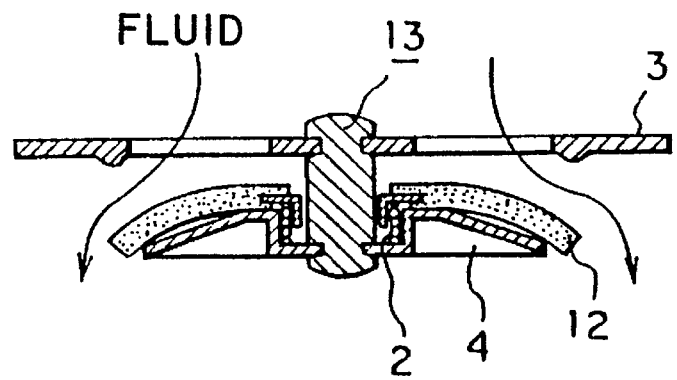

When the upstream fluid pressure becomes higher, the dynamic pressure of the fluid, passing through the flow path defined between the valve element 12 and the valve seat 3, increases in proportion to the square of the flow velocity. Hence, an amount of deformation increases at an outer edge of the valve element 12, resulting in progressive deformation of the valve element 12 as shown in FIGS. 2 and 3(c). This results in a larger sectional area of the flow path. The stopper 4 restricts the maximum amount of deformation of the valve element 12.

Figure 5:
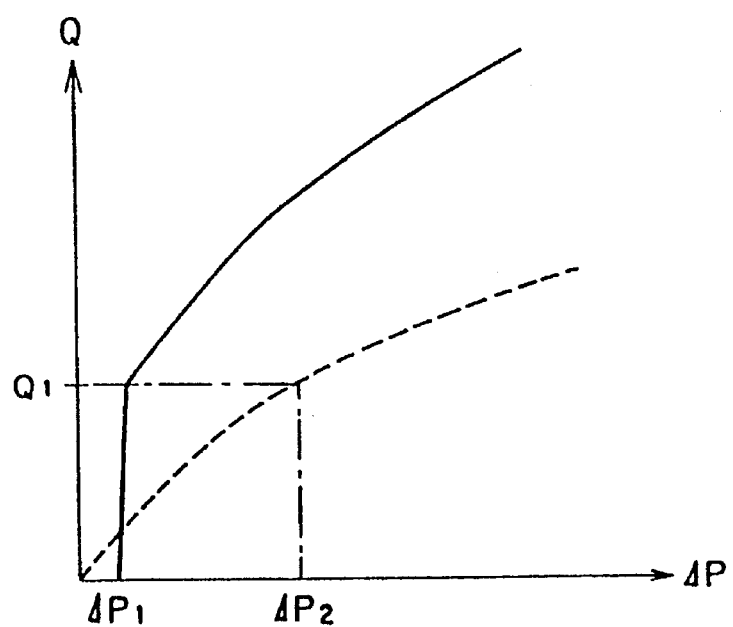
FIG. 5 is a graph diagram showing a pressure loss characteristic of the check valve shown in FIGS. 12 and 2.
Figure 11:
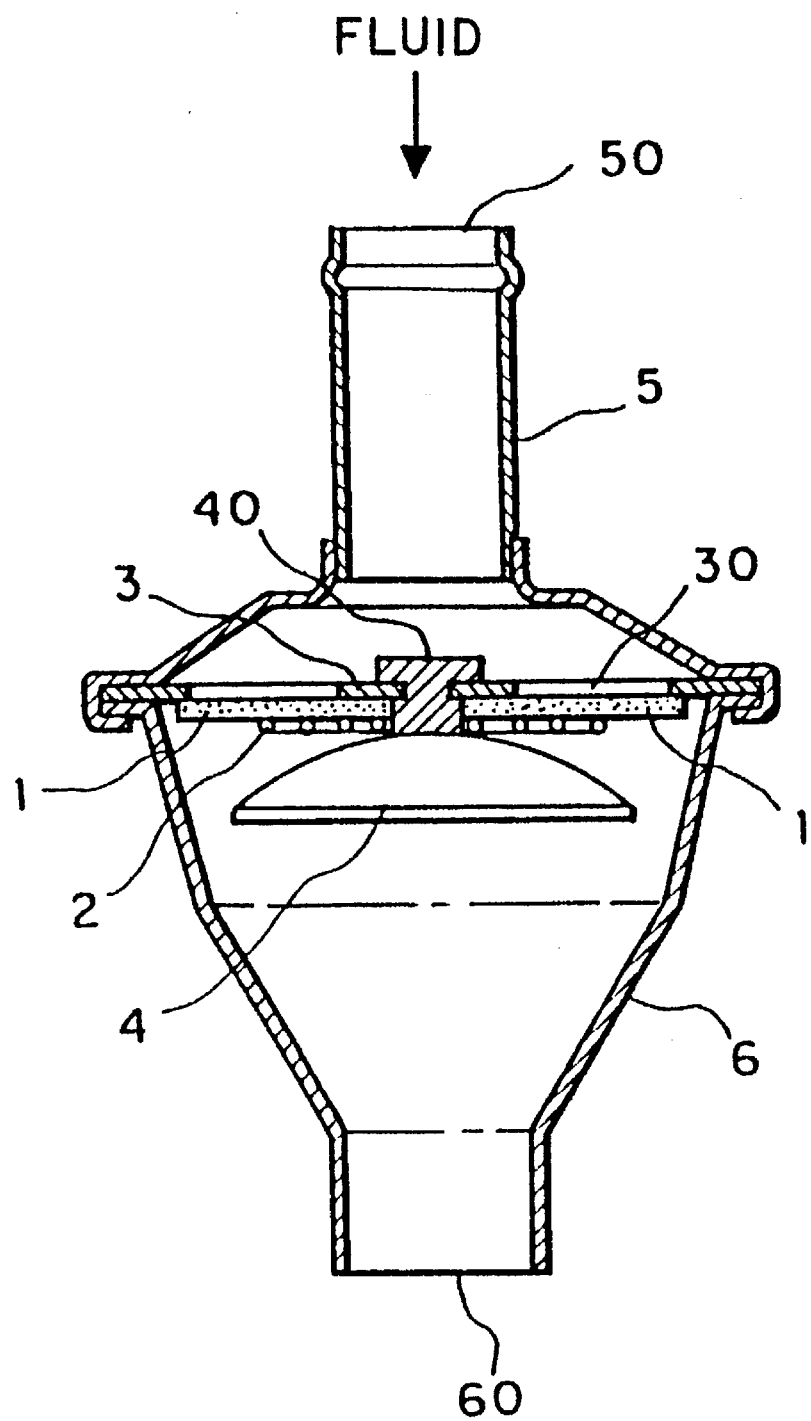
FIG. 11 is a sectional view of a conventional check valve with a valve element closed.
Figure 12:
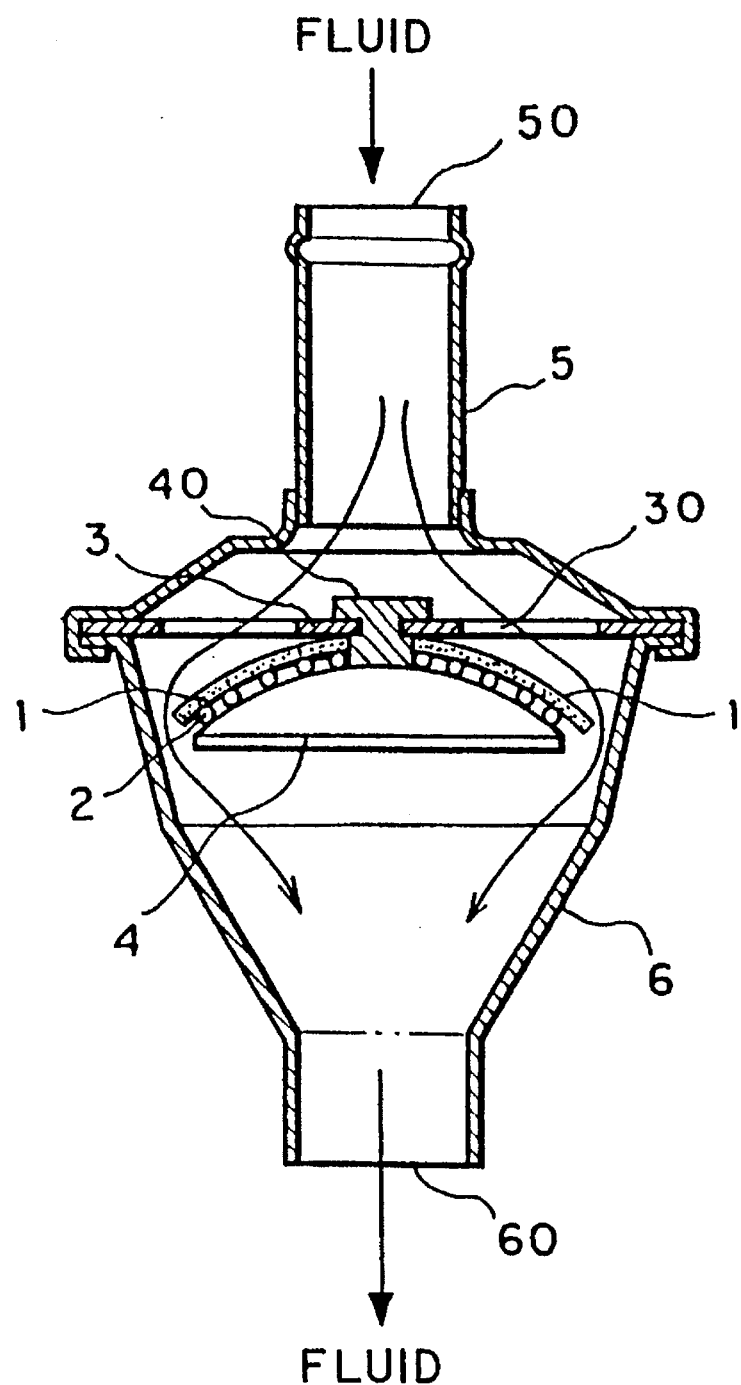
FIG. 12 is a sectional view of the conventional check valve with the valve element opened.

FIG. 5 is a graph diagram showing a pressure loss characteristic of the check valve in the embodiment. In the drawing, the transverse axis denotes pressure difference $\Delta p$ between the upstream and downstream, and the ordinate axis denotes a flow rate of the fluid passing though the check valve. The broken line shows a characteristic curve inherent in the conventional check valve shown in FIGS. 11 and 12, and the solid line shows another characteristic curve inherent in the check valve in the embodiment.

As shown in FIG. 5, in the check valve in the embodiment, no flow is generated by the pressure difference $\Delta p1$ to actuate the valve element 12, or less. When pressure difference exceeds the pressure difference $\Delta p1$, the valve element 12 moves to significantly extend the sectional area of the flow path defined between the valve seat 3 and the valve element 12, thereby drastically flowing a large amount of the fluid. If the pressure difference $\Delta p$ further increases, the valve element 12 is more largely deformed to provide a larger sectional area of the flow path.

When a reduction or termination is made to the flow rate of the fluid supplied upstream of the check valve, the valve element 12 is naturally operated by the restoring force of the spring 2 disposed at the back face thereof to block the communicating hole 30 in the valve seat 3.

Further, when the fluid pressure is applied downstream of the check valve, both the force generated by the spring 2 and the fluid pressure are applied to the back face of the valve element 12 while the valve element 12 is in the closed state. This increases the pressing force of the valve element 12 to the valve seat 3 so as to enhance a sealing effect, resulting in a more improved function of the check valve.

In the embodiment, the sliding portion to move the valve element in the downstream direction is disposed downstream of the valve seat. However, it must be noted that the shaft 13 may be integrally formed with the valve element 12, a boss portion may be provided in the valve seat 3, and the sliding portion of the valve element may be disposed upstream of the valve seat. In this case, the same effect can be provided.

Figure 6:
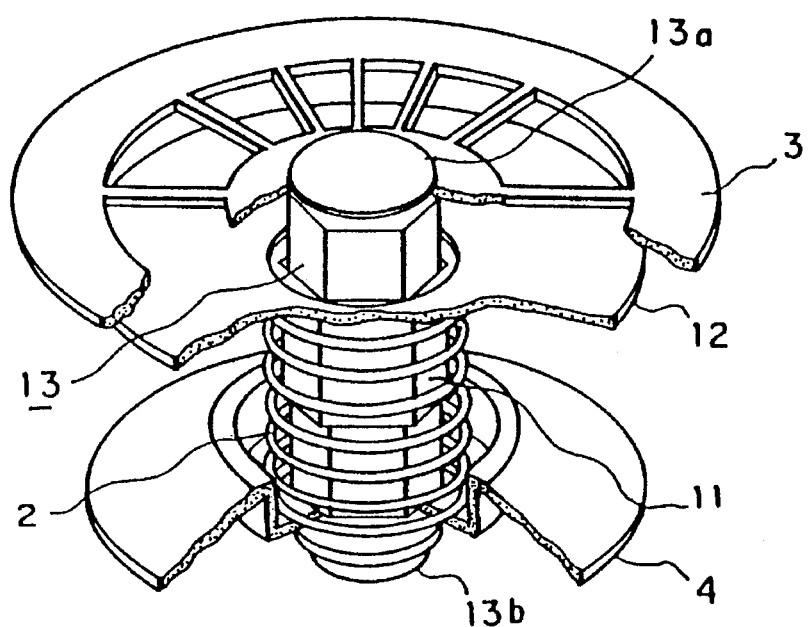
FIG. 6 is a perspective view showing an essential part of another embodiment of the check valve of the present invention.

FIG. 6 is a perspective view showing an essential part of another embodiment of the check valve of the present invention. Though the metallic bushing 11 and the shaft 13 have circular sections in the first embodiment, a metallic bushing 11 and a shaft 13 in this embodiment have polygonal forms.

A description will now be given of the operation. A check valve in the embodiment is basically operated as in the check valve in the first embodiment. In case of the circular metallic bushing 11 and the circular shaft 13 described in the first embodiment, only the spring 2 generates a force of constraint against rotary motion. Hence, when resonance of the spring 2 is induced by external vibration and so forth, the force of constraint is lost to cause rotational vibration of the valve element 12 in the first embodiment. As a result, there is a risk of wear of the metallic bushing 11 and the shaft 13, breakage of the spring, damage to the valve element 12 or the like.

In contrast with this, the metallic bushing 11 and the shaft 13 in this embodiment can restrict the rotary motion of the valve element 12 because of their polygonal forms, thereby providing a check valve having excellent durability.

Figure 7:
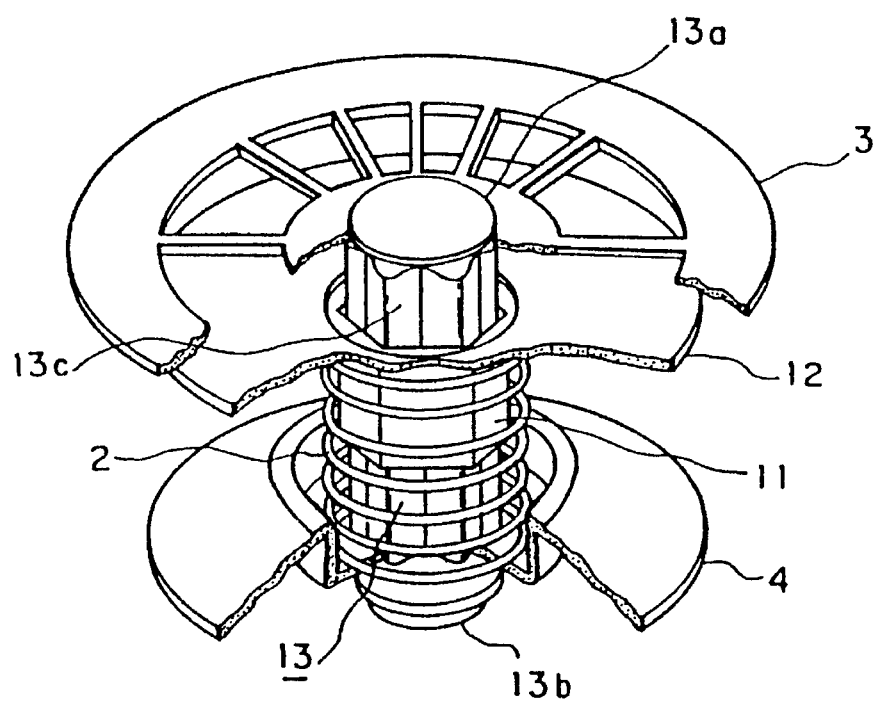
FIG. 7 is a perspective view showing an essential part of still another embodiment of the check valve of the present invention.

FIG. 7 is a perspective view showing an essential part of still another embodiment of the check valve of the present invention. Reference numeral 13c designates a groove extending in a longitudinal direction of the shaft 13. The metallic bushing 11 and the shaft 13 have polygonal sectional forms in the second embodiment. However, the metallic bushing 11 and the shaft 13 in this embodiment have star sectional forms, and a plurality of grooves 13c are provided in this shaft 13 to form a star structure.

A description will now be given of the operation. The check valve in this embodiment is basically operated as in the check valve in the first and second embodiments. In the first or second embodiment, contaminants such as soot may adhere to a sliding portion between the valve element 12 and the shaft 13 so as to form cake thereon, resulting in a risk of the interfered operation of the valve element 12.

However, in case of the check valve in this embodiment, the shaft 13 has a star section. Hence, even when contaminants such as soot enter the portion between the valve element 12 and the shaft 13, the contaminants are concentrated in the groove 13c in the shaft 13. As a result, it is possible to enhance reliability of the check valve without prevention of the operation of the valve element 12.

Figure 8:
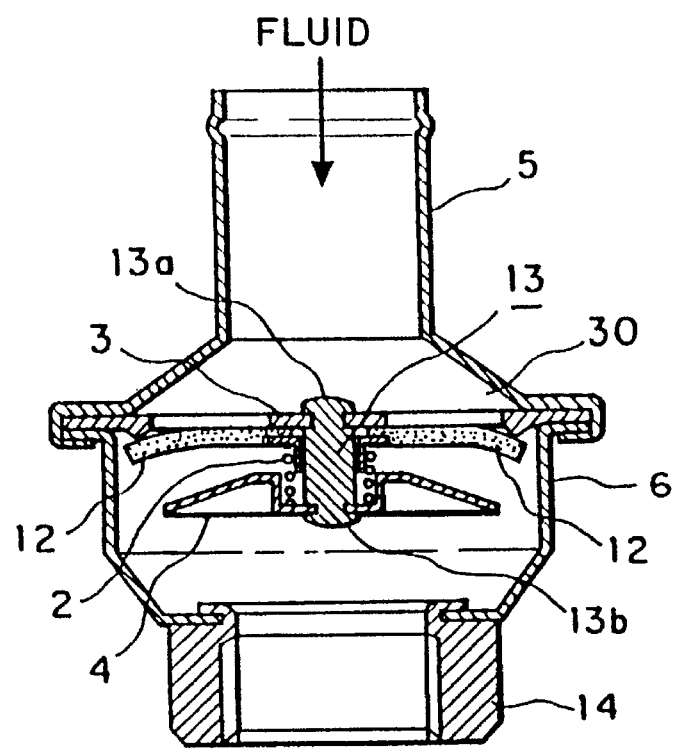
FIG. 8 is a sectional view showing a further embodiment of the check valve of the present invention.

FIG. 8 is a sectional view showing a further embodiment of the check valve of the present invention. Reference numeral 14 designates a nut mounted at an end of a downstream hollow case 6 to connect the hollow case 6 to a downstream duct. As shown in FIG. 8, the nut 14 is secured to the downstream hollow case 6 through caulking.

According to this embodiment, even when a screw is the wrong size for the duct connected downstream of the check valve, it is sufficient to simply exchange the nut 14. That is, other component parts can be used as they are so that a structure of the check valve in the embodiment is effective in cost reduction.

Figure 9:
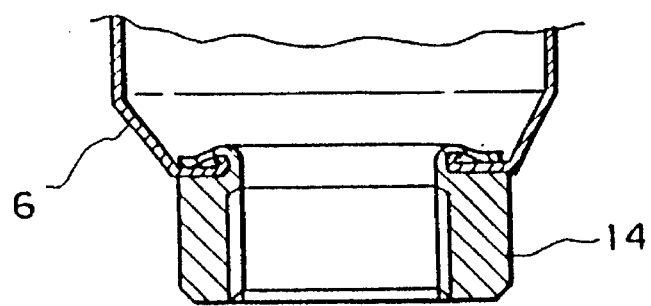
FIG. 9 is a sectional view of a downstream portion of a still further embodiment of the check valve of the present invention.

In the embodiment, although the nut 14 and the downstream hollow case 6 are secured through caulking as shown in FIG. 8, it is not intended that a securing method is limited thereby but that another securing method by caulking as shown in FIG. 9 may be employed.

Figure 10:
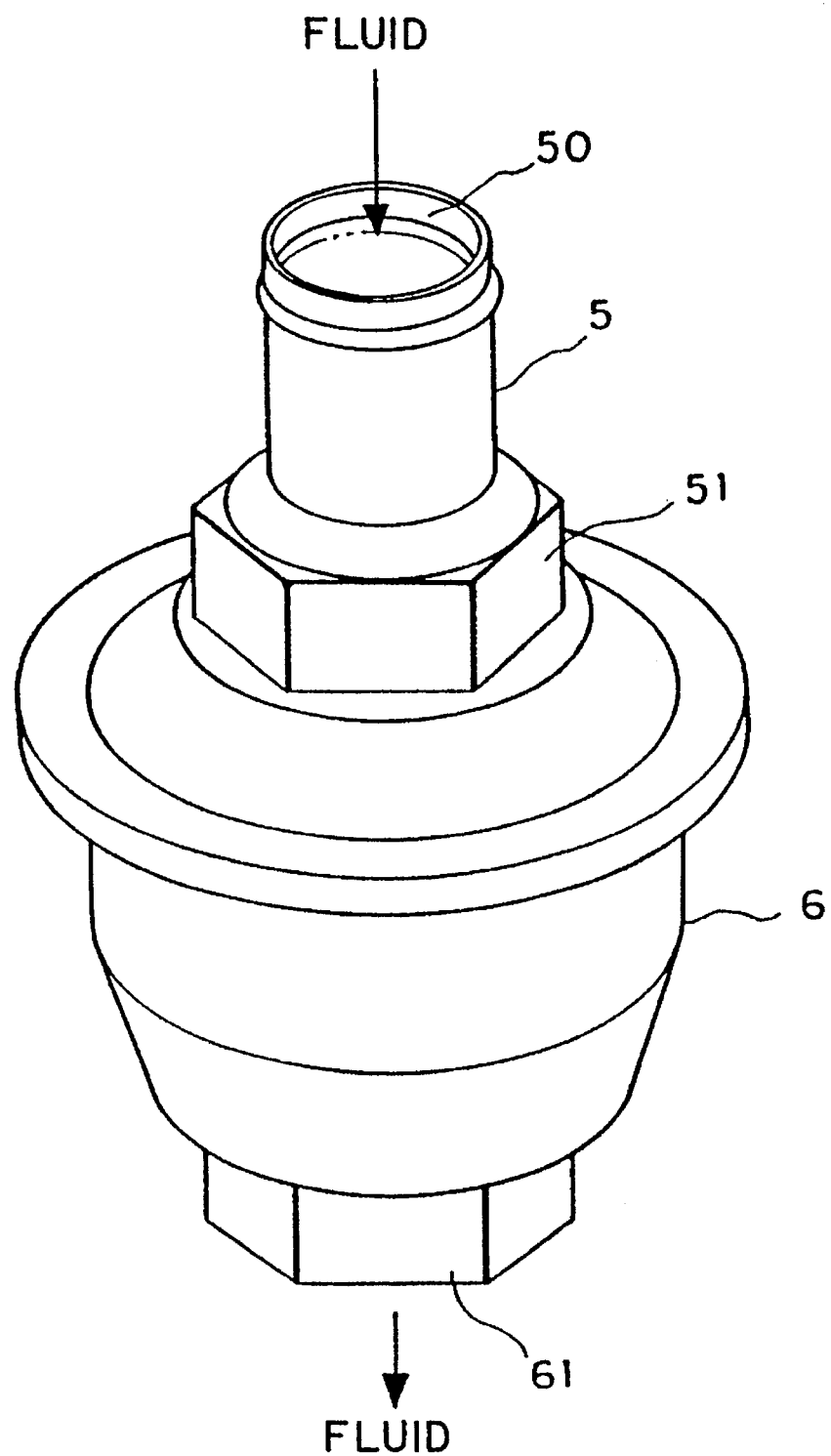
FIG. 10 is a view showing an external shape of a further embodiment of the check valve of the present invention.

FIG. 10 is a perspective view showing an external shape of a further embodiment of the check valve of the present invention. Reference numeral 51 means a throttling portion having a hexagonal section, mounted in the course of an upstream hollow case 5, and 61 is a screw portion of a downstream hollow case 6. The throttling portion 51 is provided to be engagable by box wrench and so forth when the check valve is assembled.

A description will now be given of the operation. When the check valve including the screw portion 61 of the downstream hollow case 6 is screwed into a duct to be connected, the box wrench is fitted on the hexagonal throttling portion 51 provided for the upstream hollow case 5. It is thereby possible to extremely facilitate assembling operation of the check valve, and improve an efficiency of operation.

As set forth above, the check valve of the present invention can provide many effects as follows.

It is possible to ensure a sufficient sectional area of the flow path, and significantly reduce pressure loss.

Further, in addition to the effect of significant reduction of the pressure loss, it is possible to accurately and surely move the check element.

It is also possible to restrict the rotary motion of the valve element so as to enhance reliability such as vibration proof.

Further, it is possible to provide a highly reliable check valve in which the operation of the valve element is not interfered even when contaminants enter the sliding portion.

While preferred embodiments of the invention have been described using specific terms, such description is for illustrative purposes only, and it is to be understood that changes and variations may be made without departing from the spirit or scope of the following claims.

What is claim is:

1. A check valve, comprising:

a) a cylindrical hollow case (5,6) through which fluid can pass;

b) a valve seat (3) having an outer peripheral edge supported by an inner wall of said hollow case to separate an inner space of said hollow case into an upstream space and a downstream space, a communicating hole (30) being provided in said valve seat to establish communication between said upstream space and said downstream space within said hollow case;

c) a flexible valve element (12) mounted downstream of said valve seat;

d) spring means (2) having one end engaging only a central portion of said valve element for urging said valve element in a direction of said valve seat so as to block said communicating hole in said valve seat when no fluid pressure is applied to said valve element from said upstream space, via said hole; and e) valve element guiding and supporting means (4,11,13) distinct from the spring means for supporting said valve element such that said valve element, in an undeformed state, is movable in an axial direction to partially open the valve in response to a first magnitude ($\Delta P_1$) of fluid pressure, and for restricting a range of further movement of said valve element such that said valve element can deform to reach a fully open position of the valve when the fluid pressure exceeds said first magnitude, wherein said guiding and supporting means includes a shaft (13) coupled at one end with said valve seat and extending in said axial direction, and a bushing (11) fitted onto said shaft, slidable therealong, and coupled with said valve element, and wherein the guiding and supporting means further includes a deformation limiting stopper (4) coupled with another, opposite end of the shaft, and another, opposite end of the spring means engages a central portion of the stopper.

2. A check vale according to claim 1 wherein a groove (13c) is provided in a surface of said shaft and extends in said axial direction.

3. A check valve according to claim 1, wherein said bushing includes a polygonal cylinder, and said shaft is a polygonal shaft.

4. A check valve according to claim 3, wherein a groove (13c) is provided in a surface of said shaft and extends in said axial direction.

* * * * *